(12) United States Patent
Matsuzaki et al.

(10) Patent No.: US 8,917,007 B2
(45) Date of Patent: Dec. 23, 2014

(54) AXIAL GAP MOTOR WITH MAGNETICALLY SECURELY COUPLED STATOR CORES AND PUMP DEVICE

(75) Inventors: Hirokazu Matsuzaki, Yamoto (JP); Ken Maeyama, Kawasaki (JP); Motoaki Fujimoto, Kawasaki (JP); Tomonori Kojima, Kawasaki (JP)

(73) Assignee: Fujitsu General Limited, Kawasaki-shi, Kanagawa-ken (JP)

( * ) Notice: Subject to any disclaimer, the term of this patent is extended or adjusted under 35 U.S.C. 154(b) by 257 days.

(21) Appl. No.: 13/512,505

(22) PCT Filed: Sep. 1, 2010

(86) PCT No.: PCT/JP2010/064860
§ 371 (c)(1),
(2), (4) Date: Jun. 19, 2012

(87) PCT Pub. No.: WO2011/065080
PCT Pub. Date: Jun. 3, 2011

(65) Prior Publication Data
US 2012/0263612 A1 Oct. 18, 2012

(30) Foreign Application Priority Data
Nov. 30, 2009 (JP) .................................. 2009-271062

(51) Int. Cl.
- *H02K 1/14* (2006.01)
- *F04D 13/06* (2006.01)
- *H02K 1/18* (2006.01)

(52) U.S. Cl.
CPC .......... *F04D 13/064* (2013.01); *F04D 13/0666* (2013.01); *H02K 1/148* (2013.01); *F04D 13/0626* (2013.10)

USPC .............. 310/216.007; 310/216.009; 310/268

(58) Field of Classification Search
CPC .......... H02K 1/148; H02K 1/18; H02K 1/185
USPC ..................... 310/216.113, 216.007, 216.008, 310/216.009, 268; 417/410.1
See application file for complete search history.

(56) References Cited

U.S. PATENT DOCUMENTS 3,922,574 A * 11/1975 Whiteley .................. 310/156.32
5,786,651 A 7/1998 Suzuki
(Continued)

FOREIGN PATENT DOCUMENTS

| JP | 1980-32696 U | 3/1980 |
| JP | H09-209969 A | 8/1997 |

(Continued)

OTHER PUBLICATIONS

Machine translation of JP 2007110808 A (Apr. 2007).*

*Primary Examiner* — Michael Andrews
(74) *Attorney, Agent, or Firm* — Manabu Kanesaka

(57) ABSTRACT

Disclosed are a single rotor-type axial gap motor with low magnetic loss and high output, and a pump device using the axial gap motor. A first contact surface (231) is provided on the lateral surface in one circumferential direction of a yoke strip (23), and a second contact surface (232) is provided on the lateral surface in the other circumferential direction of the yoke strip (23), wherein the first contact surface (231) and the second contact surface (232) are aligned with each other. Defining As1 and As2 as the surface areas (As) of the first and second contact surfaces (231, 232), and Ap1 and Ap2 as the projected surface areas (Ap) of the lateral surfaces of the aforementioned yoke strip seen from the circumferential direction, it holds that As>Ap.

7 Claims, 12 Drawing Sheets

(56) References Cited

U.S. PATENT DOCUMENTS

| | | |
|---|---|---|
| 2003/0020359 A1* | 1/2003 | Masumoto et al. .......... 310/216 |
| 2004/0164641 A1* | 8/2004 | Yamada et al. ............. 310/218 |
| 2006/0028093 A1* | 2/2006 | Minagawa et al. .......... 310/268 |
| 2007/0001534 A1* | 1/2007 | Kojima et al. ............. 310/268 |
| 2007/0001540 A1 | 1/2007 | Matsuzaki et al. |
| 2008/0106161 A1 | 5/2008 | Matsuzaki et al. |

FOREIGN PATENT DOCUMENTS

| | | | |
|---|---|---|---|
| JP | 2001-119872 A | | 4/2001 |
| JP | 2007-110808 A | | 4/2007 |
| JP | 2007110808 A | * | 4/2007 |
| JP | 2007-209052 A | | 8/2007 |
| JP | 2010-220288 A | | 9/2010 |

* cited by examiner

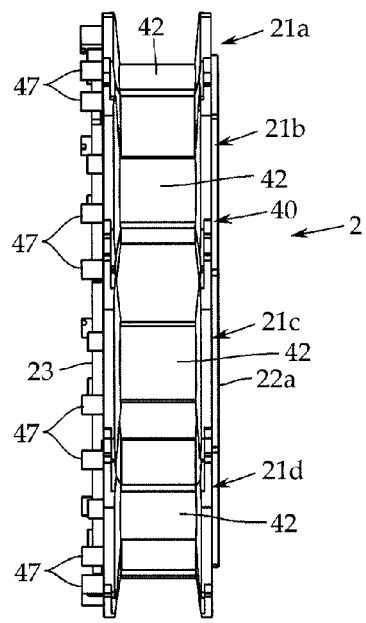
FIG. 4
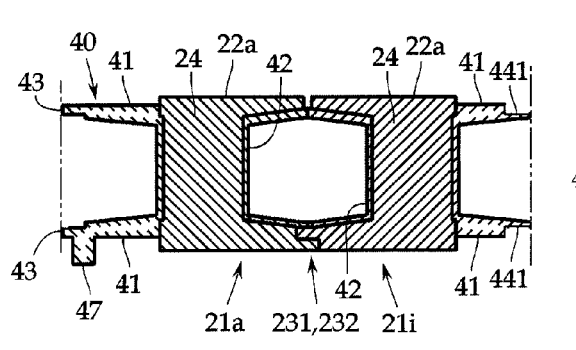
FIG. 5A
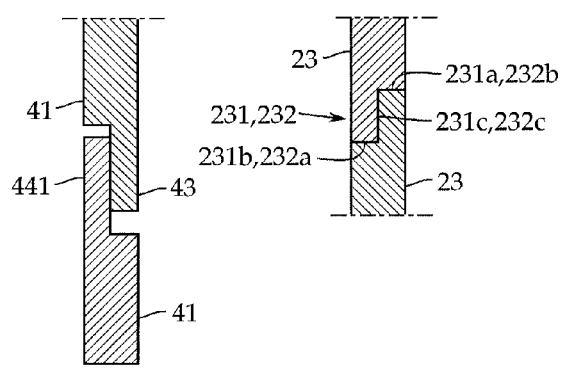
FIG. 5B     FIG. 5C

AXIAL GAP MOTOR WITH MAGNETICALLY SECURELY COUPLED STATOR CORES AND PUMP DEVICE

RELATED APPLICATIONS

The present application is National Phase of International Application No. PCT/JP2010/064860 filed Sep. 1, 2010, and claims priority from Japanese Application No. 2009-271062, filed Nov. 30, 2009.

TECHNICAL FIELD

The present invention relates to a single rotor-type axial gap motor in which a rotor and a stator are arranged to be opposed to each other with a predetermined gap along the axis line direction of a rotor output shaft and, more particularly, to an axial gap motor in which yoke strips included in a yoke section of a stator core are magnetically surely coupled to each other to realize higher efficiency.

BACKGROUND ART

For example, as disclosed in Patent Literature 1, the axial gap motor is a motor in which a rotor is arranged to be opposed to the lateral surface in one direction or each of the lateral surfaces in both directions of a stator with a predetermined gap. Compared with a radial gap motor, it is possible to reduce the overall length in a rotating shaft direction irrespective of the magnitude of an output.

The stator is formed by plural core members annularly coupled to one another centering on the axis line direction of a rotor output shaft. Consequently, it is possible to easily assemble the stator simply by applying a winding wire to the core members in advance and coupling and connecting the core members.

However, for example, as disclosed in Patent Literature 2, in the case of a so-called single rotor axial gap motor in which one rotor is arranged on one surface of a stator, it is desirable to provide, on a counter rotor side of a stator core, a yoke section configured by coupling yoke strips provided in core members, realize an expansion of a magnetic flux path, and obtain a higher output.

However, in the case of the divided core-type axial gap motor explained above, since the end faces of the yoke strips of the core members adjacent to each other are set in contact with each other to form one magnetic circuit, it is likely that a contact area cannot be secured sufficiently large and magnetic resistance increases. If the contact area cannot be secured large, for example, since the end faces in contact with each other tend to be separated when receiving a shock, it is likely that the magnetic resistance further increases and magnetic loss of the motor increases.

As an example of a use of the axial gap motor, for example, there is a pump device disclosed in Patent Literature 3. The pump device includes a motor chamber and a pump chamber divided via a predetermined partition wall. The stator is arranged in the motor chamber and the rotor is arranged in the pump chamber. An impeller for a pump is integrally provided in the rotor to make it possible to discharge, with the torque of the rotor, fluid taken into the pump chamber.

However, when the divided core-type axial gap motor is used in the pump device, there is a problem explained below. In the axial gap motor disclosed in Patent Literature 1, coupling means for coupling the core members, a bridge for processing a connecting wire, and the like are provided on the lateral surface of a flange section of an insulator.

Therefore, since a part of the flange section further projects than a teeth surface, when the axial gap motor is incorporated in the motor chamber of the pump device, a gap between a teeth surface of the stator and a magnet surface of the rotor inevitably increases. As a result, a motor output decreases.

CITATION LIST

Patent Literature

Patent Literature 1: Japanese Patent Application Publication No. 2008-118833
Patent Literature 2: Japanese Patent Application Publication No. 2006-50745
Patent Literature 3: Japanese Patent Application Publication No. 09-209969

SUMMARY OF INVENTION

Technical Problem

Therefore, the present invention has been devised in order to solve the problems and it is an object of the present invention to provide a single rotor-type axial gap motor with low magnetic loss and high output and a pump device using the axial gap motor.

Solution to Problem

In order to attain the object, the present invention includes several characteristics explained below. An invention in a first aspect is an axial gap motor in which a stator and a rotor are arranged to be opposed to each other with a predetermined gap along the axis line direction of a rotor output shaft of the rotor, the stator includes plural core members annularly arranged centering on the axis line of the rotor output shaft, and the core members are coupled to one another via predetermined coupling means, characterized in that each of the core members includes a stator iron core including a teeth surface opposed to the rotor, a winding section that extends in the axis line direction from the teeth surface and around which a winding wire is wound, and a yoke strip for coupling the core members to form a part of an annular yoke section on one end side in the axis line direction of the stator, contact surfaces of the core members adjacent to each other in the circumferential direction that come into contact with the yoke strip are provided on both end sides in the circumferential direction of the yoke strip, and, when the surface area of the contact surfaces is represented as As, the projected area of the lateral surface of the yoke strip viewed from the circumferential direction is represented as Ap, the contact surfaces and the lateral surfaces are formed to satisfy a relation As>Ap.

In a second aspect of the invention, each of the contact surfaces includes two or more surfaces, and at least one of the surfaces is provided substantially parallel to the teeth surface.

In a third aspect of the invention, each of the contact surfaces includes an arcuate surface, and the arcuate surface is formed in a convex or concave shape in the circumferential direction.

In a fourth aspect of the invention, positional deviation preventing means for preventing positional deviation in a state in which the contact surfaces are aligned with each other is provided on each of the contact surfaces.

In a fifth aspect of the invention, the core member further includes an insulator that covers the outer circumference of the stator iron core leaving the teeth surface of the winding section, the insulator is formed in a bobbin shape including a pair of flange sections parallel to each other along the teeth surface, and an upper flange on the teeth surface side is formed to be lower than the teeth surface in the axis line direction.

In a sixth aspect of the invention, a hook section functioning as first coupling means is protrudingly provided on one end side in the circumferential direction of the flange section, a locking shaft to which the hook section is locked is provided on the other end side in the circumferential direction of the flange section, and the locking shaft is formed to have axial direction height lower than the teeth surface in the axis line direction.

In a seventh aspect of the invention, when the core members are coupled to one another, parts of the flange sections adjacent to each other are arranged to overlap each other in the axis line direction and a contact section on the yoke strip side where the flange sections overlap each other and a contact section of the core members are arranged such that overlapping directions are alternate in the axis line direction.

In an eighth aspect of the invention, the core member includes a laminated steel plate, and the contact surfaces are provided to be substantially parallel to a laminating direction of the laminated steep plate and perpendicular to the axis line direction.

The present invention also includes a pump device incorporating the axial gap motor. An invention in a ninth aspect of the invention is a pump device using the axial gap motor described in any one of the fifth to seventh aspects, wherein the pump device is divided into a motor chamber and a pump chamber by a partition wall in which a thick portion having large thickness and a thin portion having small thickness in the axis line direction are provided, in the motor chamber, the stator of the axial gap motor is arranged such that the teeth surface is opposed to the thin portion of the partition wall, and, in the pump chamber, the rotor of the axial gap motor is arranged to be opposed to the stator across the partition wall.

Advantageous Effects of Invention

According to the first aspect of the invention, when the surface rea of the contact surfaces that come into contact with the yoke strip when yoke strips are coupled to each other is represented as As and the projected area of the lateral surface of the yoke strip viewed from the circumferential direction is represented as Ap, the contact surfaces are formed to satisfy the relation As>Ap. Consequently, since the contact surfaces can be surely brought into contact with each other, it is possible to secure a magnetic flux path.

According to the second and third aspects of the inventions, the contact surface includes at least two or more surfaces. Consequently, it is possible to easily increase a contact area by providing two or more contact surfaces. Further, the contact surface includes the arcuate surface. Consequently, it is possible to further increase the surface area than a flat surface and increase magnetic flux density.

According to the fourth aspect of the invention, the positional deviation preventing means for preventing positional deviation of the contact surfaces is provided on the contact surface. Consequently, even if external force is applied, since the contact surfaces are coupled by the positional deviation preventing means, it is possible to surely maintain the coupling.

According to the fifth aspect of the invention, the flange on the teeth surface side of the pair of flange sections of the insulator attached to the core member is formed to be lower than the teeth surface in the axis line direction. Consequently, since the teeth surface is located in the highest position, it is possible to reduce a gap between the teeth surface and the rotor and reduce an axial direction dimension.

According to the sixth aspect of the invention, the locking shaft provided on the other end side in the circumferential direction of the flange section is formed to have the axis line direction height lower than the teeth surface in the axis line direction. Consequently, since the locking shaft is not an obstacle, it is possible to further reduce the gap between the teeth surface and the rotor.

According to the seventh aspect of the invention, when the core members are coupled to one another, parts of the flange sections of the core members adjacent to each other are arranged to overlap each other along the axis line direction. The contact surface of the flange section and the contact surface of the yoke strip are arranged in opposite directions with respect to the axis line direction such that the contact surface of the flange section comes into contact from any one side in the axis line direction and the contact surface of the yoke strip comes into contact from the other side in the axis line direction. Therefore, it is possible to surely prevent the core member from coming off in the axis line direction.

According to the eighth aspect of the invention, the core member is configured using the laminated steel plate in which electromagnetic steel plates are laminated. Consequently, since one steel plate comes into contact with plural steel plates, a magnetic path is secured. Further, even if magnetic fluxes concentrate on the one steel plate, since the magnetic fluxes are dispersed to the steel plates around the one steel plate, magnetic saturation is relaxed.

According to the ninth aspect of the invention, the stator of the axial gap motor described in any one of the first to seventh aspects is arranged in the motor chamber and the rotor of the axial gap motor described in any one of the first to seventh aspects is arranged in the pump chamber. Therefore, it is possible set the distance between the stator and the rotor arranged to be opposed to each other across the partition wall as small as possible and increase a motor output as much as possible.

BRIEF DESCRIPTION OF DRAWINGS

FIG. 4 is a side view of the stator.

FIG. 5(a) is an A-A line sectional view of FIG. 3(a), FIG. 5(b) is a D-D line sectional view of FIG. 3(a), and FIG. 5(c) is an enlarged sectional view of a coupling section of a stator iron core.

DESCRIPTION OF EMBODIMENT

Figure 1:
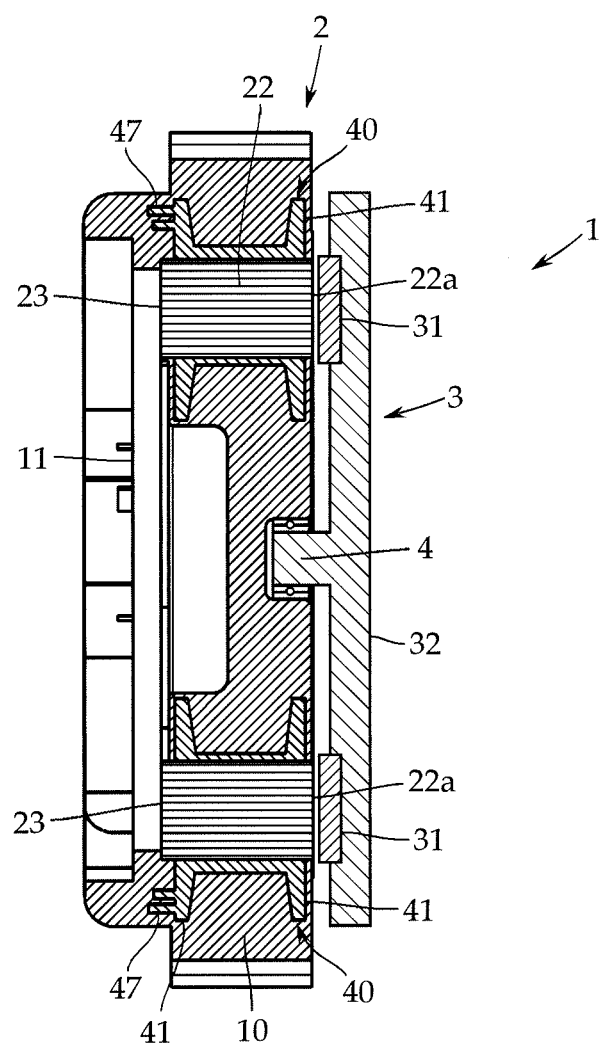
FIG. 1 is a main part sectional view of an axial gap motor according to an embodiment of the present invention.
Figure 2A:
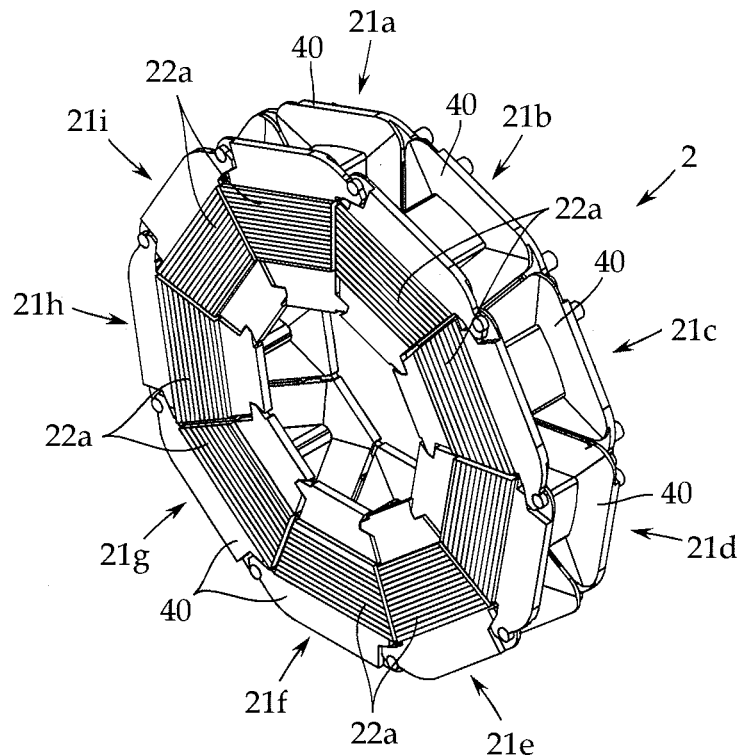
FIG. 2(a) is a perspective view of a stator of the axial gap motor viewed from a teeth surface side and FIG. 2(b) is a perspective view of the stator viewed from a yoke section side.
Figure 2B:
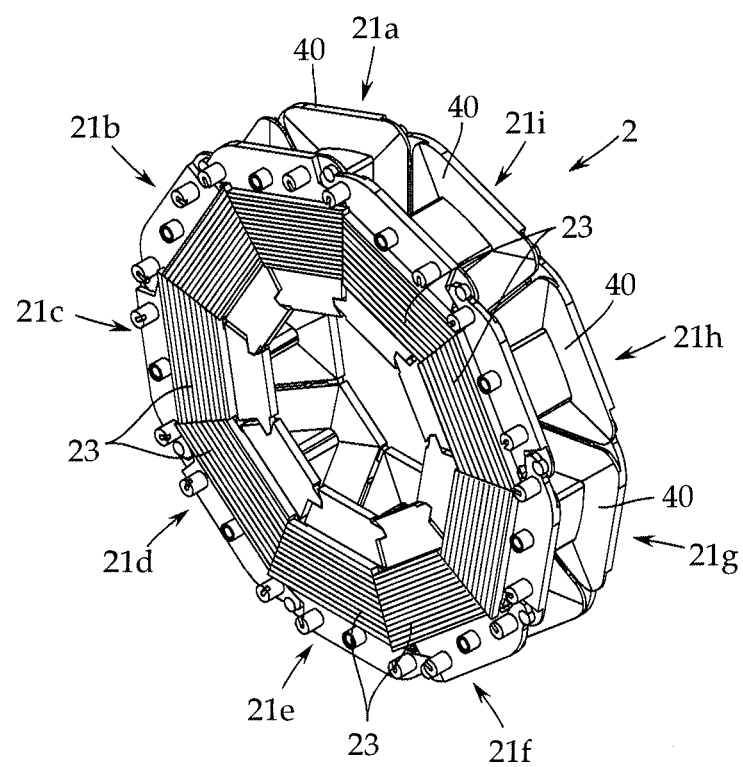
Figure 3A:
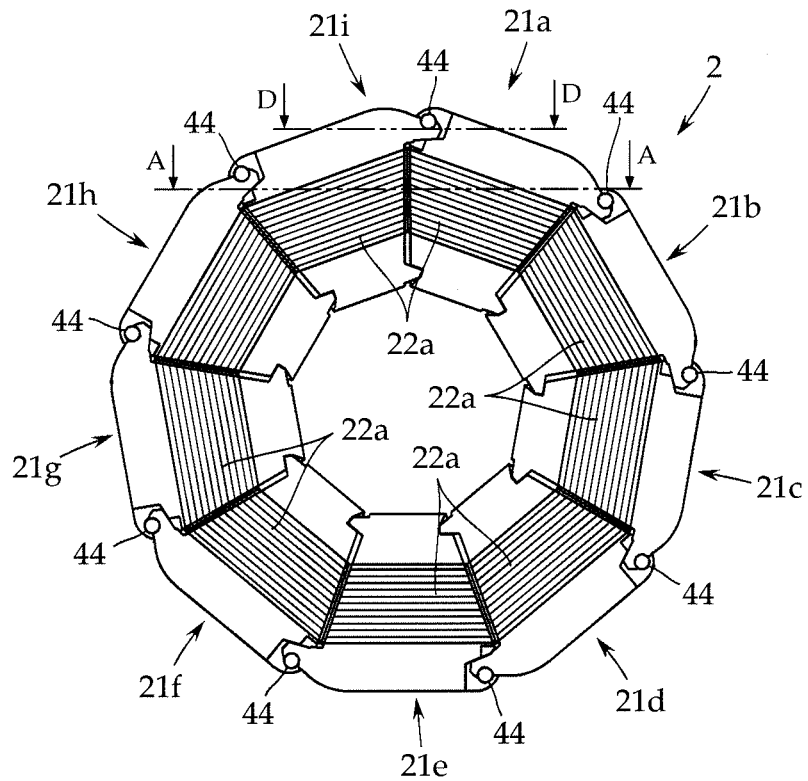
FIG. 3(a) is a front view of the stator viewed from the teeth surface side and FIG. 3(b) is a front view of the stator viewed from the yoke section side.
Figure 3B:
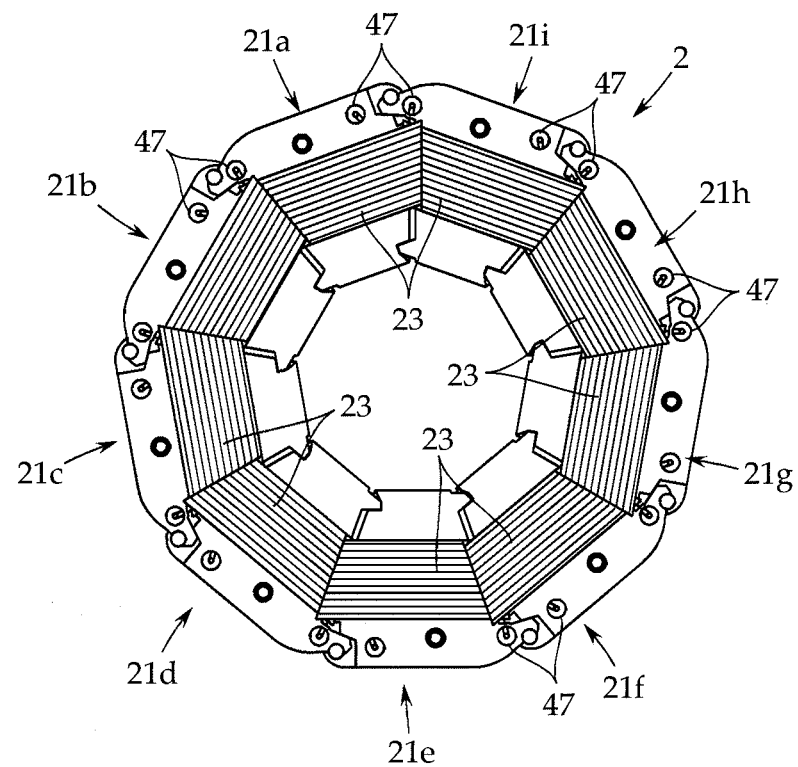

An embodiment of the present invention is explained below with reference to the drawings. However, the present invention is not limited to the embodiment. As shown in FIG. 1, this axial gap motor 1 includes a stator 2 that forms an outer shell with a resin compact 10 excluding teeth surfaces 22a of the stator 2 and end faces of yoke strips 23 and a rotor 3 arranged to be opposed to one surface (in FIG. 1, the right lateral surface) of the stator 2 with a predetermined gap (air gap). A rotor output shaft 4 is coaxially fixed to the rotor 3.

The stator 2 is annularly formed centering on the axis line direction of the rotor output shaft 4 and is molded integrally with the resin compact 10 by insert molding. On the counter rotor side (in FIG. 1, the left lateral surface side) of the stator 2, a substrate pedestal 11 on which a not-shown control board is fixed is integrally molded by the resin compact 10.

In the rotor 3, a large number of magnets 31 are provided in the circumferential direction to be opposed to the teeth surfaces 22a of the stator 2 on one surface (in FIG. 1, the left lateral surface) of a disc-like rotor back yoke 32. In the present invention, a specific configuration of the rotor 3 may be arbitrary. The rotor output shaft 4 is supported by one bearing housed in a bearing housing section provided in the stator 2. However, a supporting structure for the output shaft is not limited to this and may be arbitrary.

Referring to FIGS. 2(a) to 7(e) as well, the stator 2 includes plural core members 21a to 21i annularly arranged centering on the axis line of the rotor output shaft 4. In this example, the core members 21a to 21i include nine core members (nine slots). Since all the core members 21a to 21i have the same shape, the core member 21a is explained as an example.

The core member 21a includes a stator iron core 24 and an insulator 40 attached to cover the outer circumference of the stator iron core 24. In this example, as shown in a sectional view of FIG. 7(d), the stator iron core 24 is formed by laminating electromagnetic steel plates, which are stamped out in an H shape, in the radial direction of the stator 2 (the up down direction in FIG. 7(a)). However, besides, the stator iron core 24 may be formed by powder molding, cutting, and the like.

The stator iron core 24 includes a winding section 22 around which a not-shown winding wire is wound via the insulator 40 and the yoke strip 23 integrally formed on the proximal end side of the winding section 22. On the distal end side (in FIG. 1, the right lateral surface side) of the winding section 22, a fan-shaped teeth surface 22a opposed to the rotor magnet 31 of the rotor 3 is integrally provided. The stator iron core 24 is formed in a bobbin shape including the flange-like teeth surface 22a and the yoke strip 23 at both ends of the winding section 22.

Figure 7A:
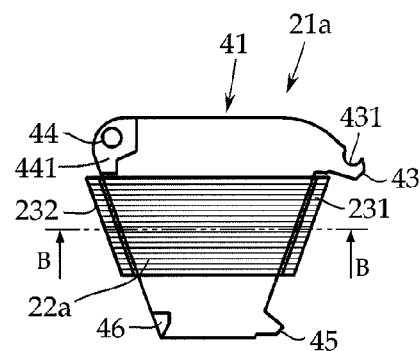
FIG. 7(a) is a front view of the core member.
Figure 7B:
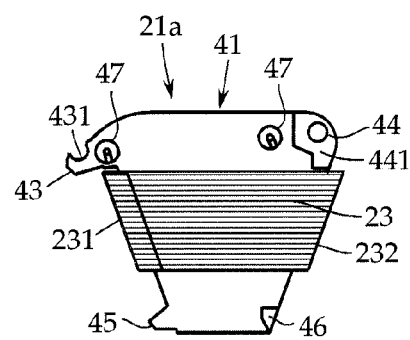
FIG. 7(b) is a rear view of the core member.
Figure 7C:
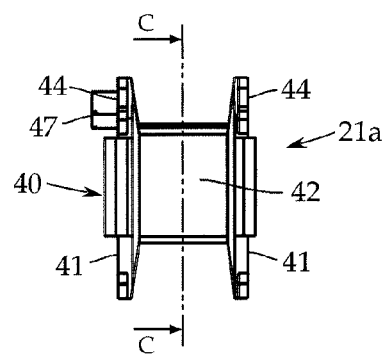
FIG. 7(c) is a plan view of the core member.
Figure 7D:
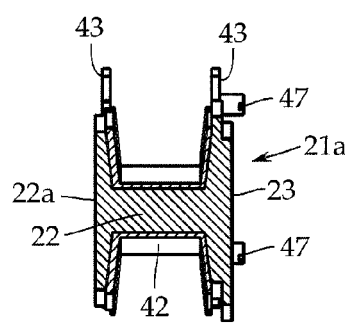
FIG. 7(d) is a B-B line sectional view of the core member.
Figure 7E:
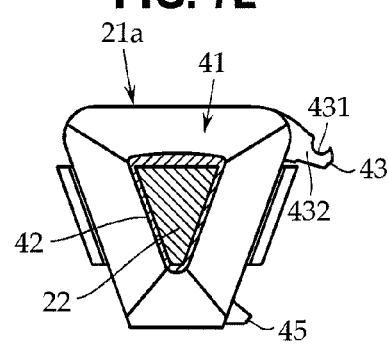
FIG. 7(e) is a C-C sectional view of the core member.
Figure 8A:
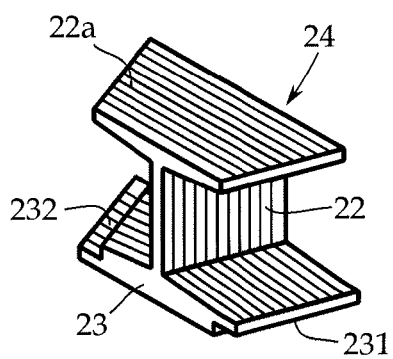
FIG. 8(a) is a perspective view of the stator iron core viewed from the inner diameter side and FIG. 8(b) is a perspective view of the stator iron core viewed from the outer diameter side.
Figure 8B:
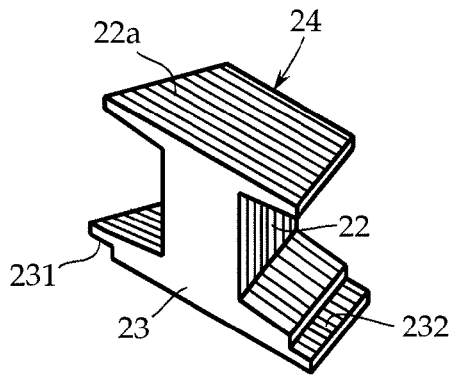

As shown in FIGS. 8(a) to 9(e), the winding section 22 is formed in a triangular shape in cross section, the width of which in the radial direction gradually increases from the inner diameter side (the lower side in FIG. 7(e)) toward the outer diameter side (the upper side in FIG. 7(e)). In this example, the winding section 22 is formed in a trapezoidal shape. However, the shape of the winding section 22 may be arbitrary according to a use.

The teeth surface 22a is also formed such that the width in the circumferential direction gradually increases from the inner diameter side (the lower side in FIG. 7(a)) toward the outer diameter side (the upper side in FIG. 7(a)) and is formed in a fan shape viewed from the axis line direction. In this example, the teeth surface 22a is formed in the fan shape. However, the shape of the teeth surface 22a may be arbitrary according to a use.

The yoke strip 23 is provided on the proximal end side (in FIG. 7(d), the right side) of the winding section 22. The yoke strip 23 is formed such that the width in the circumferential direction gradually increases from the inner diameter side (the lower side in FIG. 7(b)) toward the outer diameter side (the upper side in FIG. 7(b)).

The width in the circumferential direction of the yoke strip 23 is formed larger than the width in the circumferential direction of the teeth surface 22a. When the stator iron core 24 and the core member 21a are viewed from the teeth surface 22a side, it looks as if parts of both ends (a first contact surface 231 and a second contact surface 232) of the yoke strip 23 respectively project from both the end sides of the teeth surface 22a by a predetermined length (see FIG. 7(a) and FIG. 9(c)).

Figure 9A:
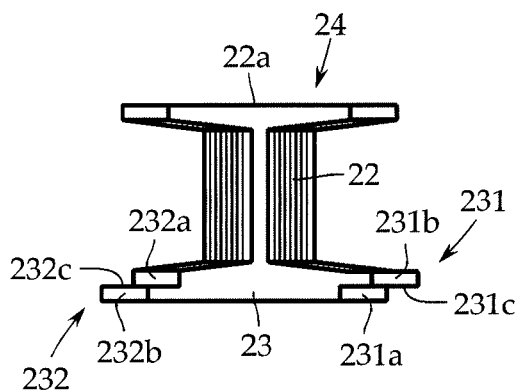
FIG. 9(a) is a front view of the stator iron core viewed from the inner diameter side.
Figure 9B:
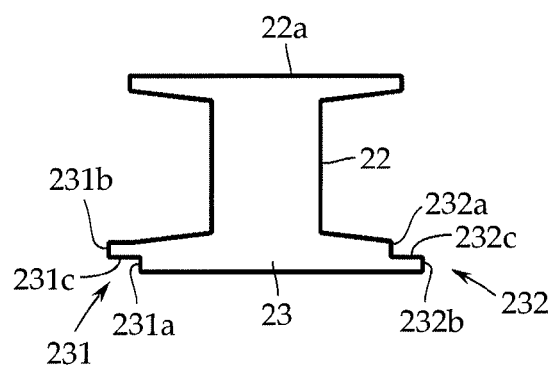
FIG. 9(b) is a rear view of the stator iron core.
Figure 9C:
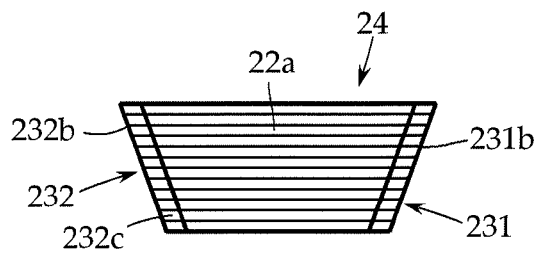
FIG. 9(c) is a plan view of the stator iron core.
Figure 9D:
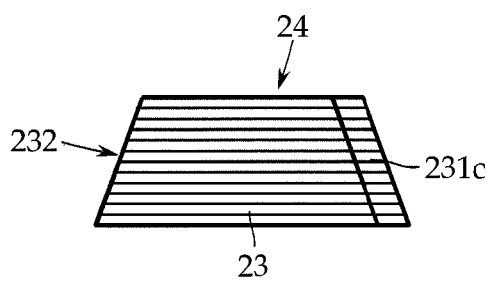
FIG. 9(d) is a bottom view of the stator iron core.

The first contact surface 231 is provided on one end side (the right side of FIG. 9(a)) in the circumferential direction of the yoke strip 23. The contact surface 232 is provided on the other end side (the left side of FIG. 9(a)).

Specifically, the first contact surface 231 is formed by an L-shaped step surface recessed one step lower in the axis line direction from the bottom surface of the yoke strip 23 and is aligned in terms of shape along the second contact surface 232 of the core member 21b adjacent to the core member 21a. The second contact surface 232 includes an L-shaped step surface recessed one step lower in the axis line direction from the upper surface of the yoke strip 23 and has a symmetrical shape with the first contact surface 231.

Figure 10A:
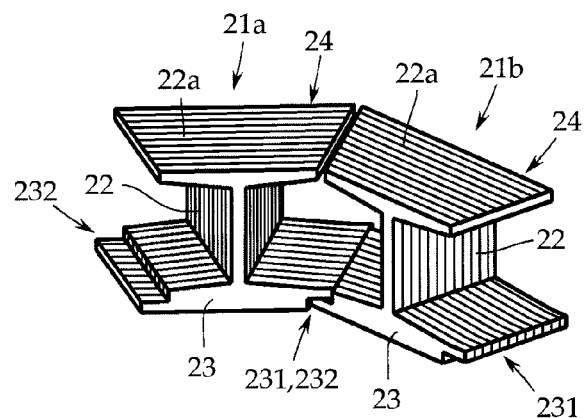
FIG. 10(a) is a schematic diagram of a state in which stator iron cores are coupled and FIG. 10(b) is a schematic diagram of a coupling portion of the stator iron cores represented by hatching.
Figure 10B:
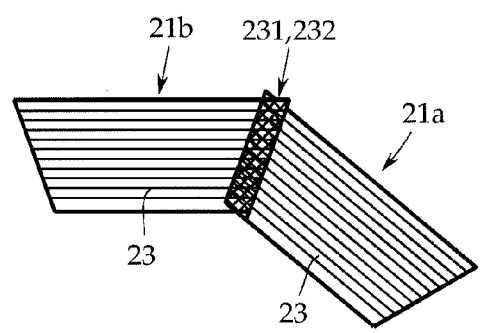

Consequently, the first contact surface 231 and the second contact surface 232 are formed by the L-shaped step surfaces. Therefore, as shown in FIGS. 10(a) and 10(b), the first contact surface 231 and the second contact surface 232 are opposed to each other and alternately meshed, whereby the contact surfaces 231 and 232 are coupled in a state in which the contact surfaces 231 and 232 are aligned with each other.

Figure 11A:
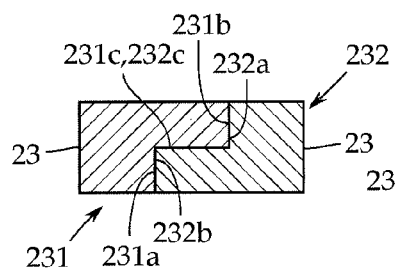
FIG. 11(a) is a schematic diagram showing a meshed state of contact surfaces.

Each of the first and second contact surfaces 231 and 232 is formed in the L shape in cross section. However, the contact surface is configured to include at least two or more surfaces. In other words, as shown in FIG. 11(a), the first and second contact surfaces 231 and 232 respectively include two contact surfaces 231a and 231b and two contact surfaces 232a and 232b parallel to each other in the axis line direction and one contact surface 231c and one contact surface 232c orthogonal to the axis line direction.

In the present invention, when a surface area As of the first contact surface 231 is represented as As1 and surface areas As of the contact surfaces 231a, 231b, and 231c are respectively represented as S1a, S1b, and S1c, the surface area As1 of the first contact surface 231 is calculated as As1=S1a+S1b+S1c. Similarly, when the surface area As of the second contact surface 232 is represented as As2 and the surfaces areas of the contact surfaces 232a, 232b, and 232c are respectively represented as S2a, S2b, and S2c, the surface area As2 of the second contact surface 232 is calculated as As2=S2a+S2b+S2c. On the other hand, when projected areas Ap of lateral surfaces of the yoke strip 23 of the first contact surface 231 and the second contact surface 232 viewed from the circumferential direction are represented as Ap1 and Ap2, the projected area Ap1 of the first contact surface 231 is calculated as Ap1=S1a+S1b (the projected area Ap2 of the second contact surface 232 is S2a+S2b). Therefore, the first and second contact surfaces 231 and 232 are formed to satisfy relations As1>Ap1 and As2>Ap2.

The surface areas of the first contact surface 231 and the second contact surface 232 are formed larger than the projected areas of the lateral surfaces of the yoke strip 23 viewed from the circumferential direction. Therefore, a contact area can be secured large. As a result, even if adjacent core members (e.g., the core member 21a and the core member 21b) cannot be arranged in close contact because of a dimensional error or the like and are arranged at a slight distance in the circumferential direction, it is possible to secure a path for connecting magnetic fluxes.

Figure 11B:
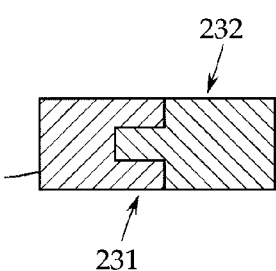
FIG. 11(b) is a schematic diagram representing a modification of meshing of the contact surfaces.

Consequently, the surface areas As of the contact surfaces 231 and 232 can be set larger than the projected areas Ap of the lateral surfaces of the yoke strip 23 viewed from the circumferential direction. As a method of further increasing the surface areas, as shown in FIG. 11(b), the first and second contact surfaces 231 and 232 may be formed as concavity and convexity and the concavity and the convexity may be meshed. Consequently, it is possible to not only increase the surface areas of the contact surfaces 231 and 232 but also more surely perform the meshing of the contact surfaces 231 and 232.

Figure 11C:
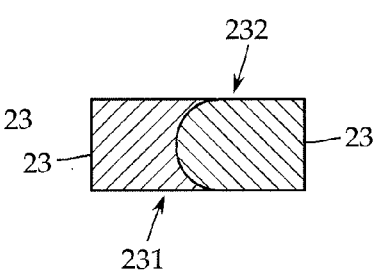
FIG. 11(c) is a schematic diagram representing a modification of the contact surfaces formed in arcuate shapes.

As another method, as shown in FIG. 11(c), the first and second contact surfaces 231 and 232 may be formed as arcuate surfaces. Specifically, one first contact surface 231 may be formed in a concave arcuate surface, the other second contact surface 232 may be formed in a convex arcuate surface aligned with the concave arcuate surface, and these contact surfaces may be aligned with each other. Such a form is also included in the present invention.

Even if the first and second contact surfaces 231 and 232 are one surface, it is possible to increase a surface area by forming the surface in an arcuate shape. Further, it is possible to also perform positioning of the contact surfaces at the same time by forming the contact surfaces as the concave and convex arcuate surfaces and aligning the contact surfaces each other.

Referring back to FIGS. 6 and 7, the insulator 40 includes flange sections 41, 41 that cover the inner circumferential surfaces of the teeth surface 22a and the yoke strip 23 and extend to both sides in the radial direction (the up and down direction of FIG. 7) from the teeth surface 22a and the yoke strip 23 and an outer cylindrical section 42 that covers the outer circumferential surface of the winding section 22.

In this example, the insulator 40 is formed of a molded product of synthetic resin and divided into about halves along the circumferential direction. The insulator 40 is attached to the stator iron core 24 by fitting in the halves from both sides (in FIG. 7(a), the left and right sides) of the stator iron core 24. The insulator 40 may be formed integrally with the stator iron core 24. In the present invention, the attachment structure for the insulator 40 may be arbitrary according to specifications.

In the flange sections 41, 41 of the insulator 40, two coupling means for coupling the core members 21a to 21i to one another in the circumferential direction are provided. First, as first coupling means, hook sections 43 for annularly coupling the core members 21a to 21i to one another centering on the rotor output shaft 4 and locking shafts 44 to which the hook sections 43 are locked are provided at ends in the circumferential direction of the flange sections 41, 41.

As shown in FIG. 7(a), the hook sections 43 are provided on the outer diameter side end faces of the flange sections 41 and are formed by tongue pieces protrudingly provided from end faces on one end side in the circumferential direction of the flange sections 41 toward the outer side in the circumferential direction. On the outer diameter side of the hook section 43, hook grooves 431 aligned along the outer circumferential surfaces of the locking shaft 44 are provided.

The hook grooves 431 are formed of semicircular arcuate surfaces aligned along the outer circumferential surfaces of the locking shafts 44. The core members 21a to 21i can be rotated one another about the axes line of the locking shafts 44 by hooking the hook grooves 431 on the outer circumferential surfaces of the locking shafts 44 provided in the adjacent core members.

The locking shafts 44 assume a columnar shape and are protrudingly provided from the lateral surfaces on the outer diameter side of the flange sections 41, which are the other end sides (the opposite sides of the hook sections 43) in the circumferential direction, in the axis line direction. The locking shafts 44 are provided such that the distal ends of the locking shafts 44 are lower than the teeth surface 22a.

Consequently, since the distal ends of the locking shafts 44 are provided in the position lower than the teeth surface 22a, the teeth surface 22a becomes the outermost surface in the axial direction of the core member 21a. Even if the axial gap motor 1 is used in, for example, a pump device in which a waterproof partition wall is interposed between the stator 2 and the rotor 3, it is possible to set the distance between the stator 2 and the rotor 3 as small as possible and minimize an output fall.

As second coupling means, locking ribs 45 and locking grooves 46 functioning as receiver sides of the locking ribs 45 are provided on the inner diameter side of the flange sections 41, 41. As shown in FIG. 7(a), the locking ribs 45 are convex pieces provided on the inner diameter side end faces in the circumferential direction of the flange sections 41, 41 and protrudingly provided from end faces on one end side (in FIG. 7(*a*), the right end) toward the outer side in the circumferential direction. In this example, the locking ribs 45 are formed in a triangular shape.

On the other hand, the locking grooves 46, 46 are formed of concave grooves (in FIG. 7(*a*), the left end) recessed one step lower in the axis line direction on the lateral surface on the inner diameter side of the flanges 41, 41, which are the lateral surfaces on the other end side in the circumferential direction. The locking grooves 46, 46 are formed as concave grooves of a triangular shape aligned with the locking ribs 45 in terms of shape.

In this example, both the locking ribs 45, 45 and the locking grooves 46, 46 are formed in the triangular shape. However, the shape of the locking ribs 45, 45 and the locking grooves 46, 46 may be arbitrarily selected according to specifications as long as the core members 21*a* to 21*i* can be annularly coupled to one another.

Figure 6A:
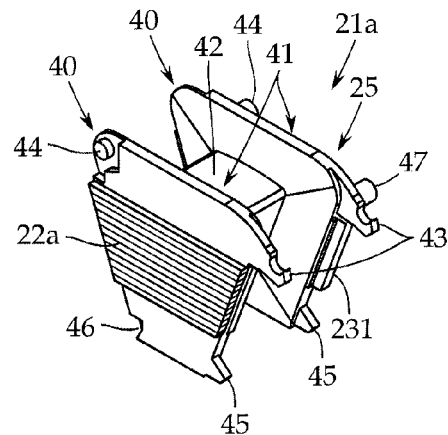
FIG. 6(a) is a perspective view of a core member of the stator viewed from the teeth surface side and FIG. 6(b) is a perspective view of the core member viewed from the yoke section side.
Figure 6B:
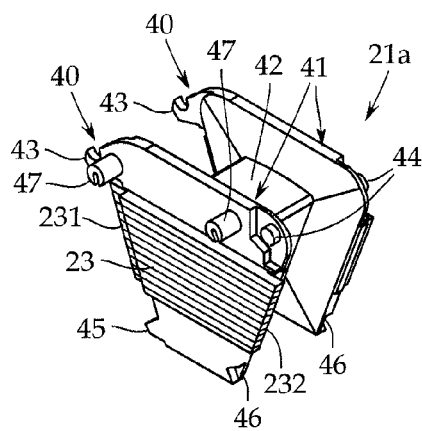

On the lateral surface of the flange section 41 on the yoke strip 23 side of the flange sections 41, 41, terminal blocks 47, 47 used for processing of connecting wires and terminal pins (both of which are not shown in the figures) are provided. As shown in FIG. 6(*b*), the terminal blocks 47, 47 are supporting shafts protrudingly provided on the lateral surface on the outer diameter side of the flange section 41 on the yoke strip 23 side. Two terminal blocks are protrudingly provided at a predetermined space.

Terminal holes into which the terminal pins are inserted are drilled at the distal ends of the terminal blocks 47, 47. In order to form the teeth surface 22*a* as the outermost surface, the terminal blocks 47, 47 are not provided in the flange section 41 on the teeth surface 22*a* side.

An example of a coupling procedure for the core members 21*a* to 21*i* is explained with reference to FIGS. 14 and 15. When the core members 21*a* to 21*i* are coupled to one another, the hook sections 43 of the core members 21*a* are hooked on the locking shaft 44 of the adjacent core member 21*i*.

Figure 14:
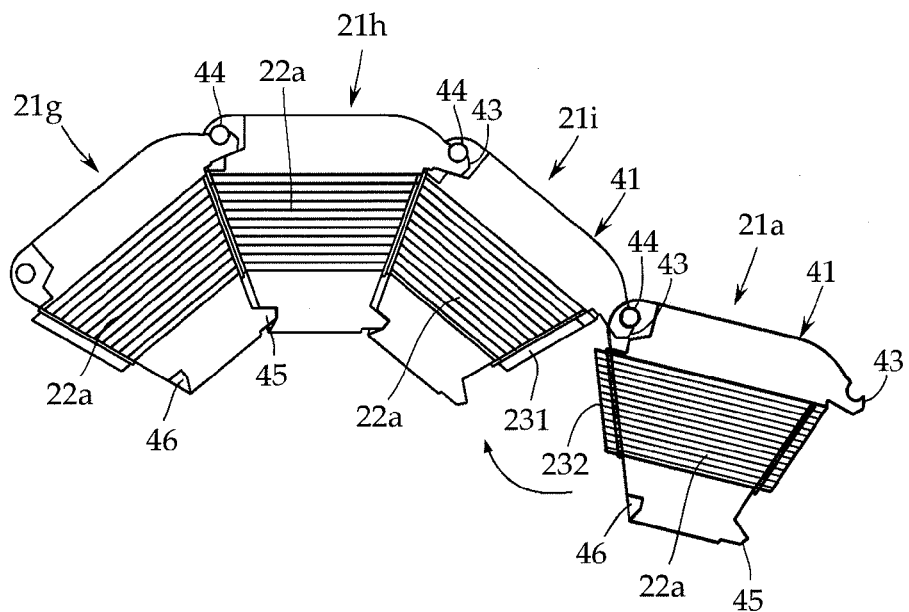
FIG. 14 is a schematic diagram for explaining an example of an assembly procedure for a stator core.
Figure 15:
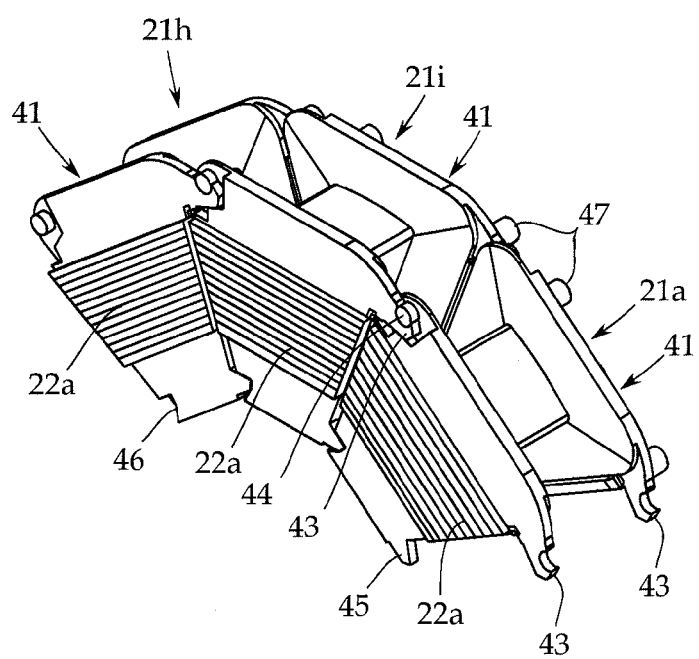
FIG. 15 is a schematic diagram for explaining the example of the assembly procedure for the stator core.

When the core member 21*a* is pivoted in an arrow direction in FIG. 14 about the axis line of the locking shaft 44 while keeping the hooked state of the hook sections 43, the locking ribs 45 provided on the inner diameter side of the adjacent core member 21*i* are inserted along the locking grooves 46 of the core member 21*a*. The core members 21*a* and 21*i* are coupled as shown in FIG. 15.

By performing the series of steps for each of the core members 21*a* to 21*i*, all the core members 21*a* to 21*i* are annularly coupled. As shown in FIGS. 5(*a*) and 5(*b*), when the core members 21*a* to 21*i* are coupled to one another, in the flange sections 41, 41 of the core members 21*a* to 21*i* adjacent to one another, locking shaft peripheral sections 441, 441 and the hook sections 43, 43 come into contact with each other to overlap each other in the axis line direction.

On the other hand, the contact surfaces 231*c*, 232*c* in the axial direction of the yoke strip 23 come into contact with each other to overlap each other in the axis line direction (FIG. 5(*c*)). Consequently, as shown in FIG. 5(*a*), since the overlapping directions of the flange sections 41, 41 and the yoke strips 23, 23 are alternate in the axis line direction, a direction in which the flange sections 41, 41 come off and a direction in which the yoke strips 23, 23 come off are opposed to each other. Therefore, the coupling of the core members 21*a* to 21*i* can be made firmer.

Figure 12A:
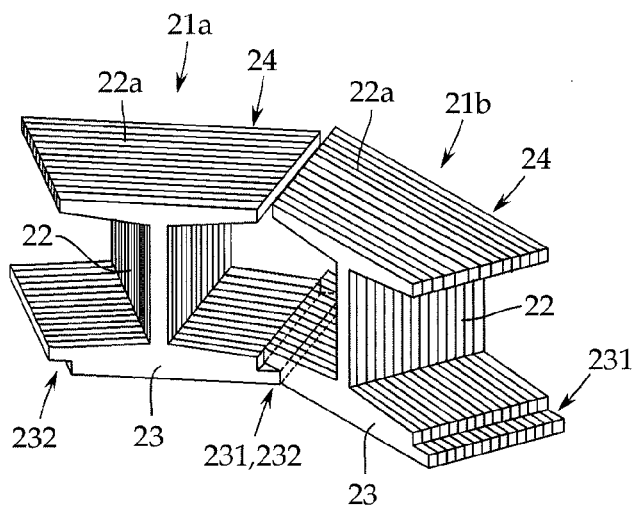
FIG. 12(a) is a schematic diagram of a state in which stator iron cores are coupled to each other and FIG. 12(b) is a schematic diagram representing a coupling portion of the stator iron cores represented by hatching.
Figure 12B:
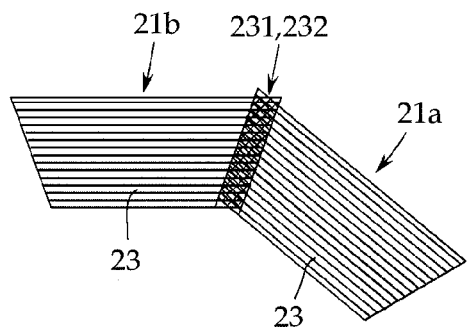
Figure 13:
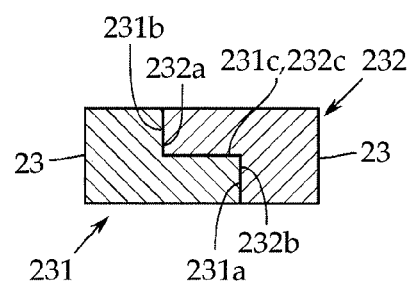
FIG. 13 is a schematic diagram showing a meshed state of contact surfaces.

In this example, the contact surfaces 231*c*, 232*c* in the axial direction of the yoke strip 23 are arranged to overlap each other in the axis line direction. However, as shown in Figures 12(*a*), 12(*b*) and 13, the contact surfaces 231*c*, 232*c* may be provided upside down as long as the contact surfaces 231*c*, 232*c* can overlap each other in the axis line direction.

As explained above, when the contact surfaces provided at both the ends in the circumferential direction of the yoke strip 23 include the contact surfaces 231*c* arranged to overlap the contact surfaces of the adjacent yoke strip in the axis line direction, by forming the core members 21*a* to 21*i* using the laminated steel plate in which the electromagnetic steel plates are laminated as shown in FIGS. 10(*a*) to 11(*c*) an effect of relaxation of magnetic saturation is obtained in addition to securing of a magnetic path. Specifically, as shown in FIG. 10(*b*) or FIG. 12(*b*), by forming the core members using the laminated steel plate in which the electromagnetic steel plates are laminated, a magnetic path is secured because one steel plate is in contact with plural steel plates. Further, even if magnetic fluxes concentrate on the one steel plate, since the magnetic fluxes are dispersed to the steel plates around the one steel plates, magnetic saturation is relaxed.

In this example, the first and second contact surfaces 231 and 232 are formed in an L shape in cross section. The yoke strips 23 are annularly coupled to each other by aligning the first and second contact surfaces 231, 232 each other. However, positional deviation preventing means for preventing the first and second contact surfaces 231, 232 from deviating in the coupled state may be provided.

Figure 16A:
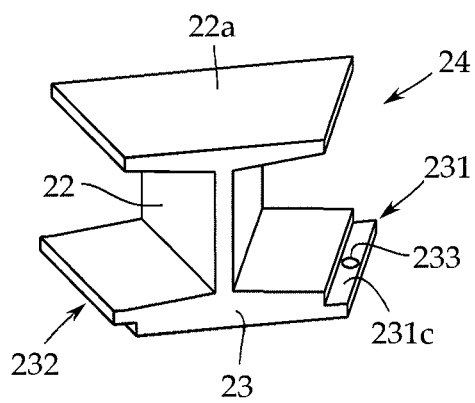
FIG. 16(a) is a perspective view of a stator iron core including first positional deviation preventing means viewed from the inner diameter side.
Figure 16B:
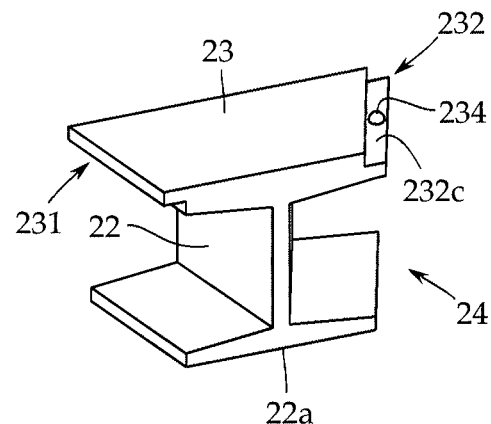
FIG. 16(b) is a perspective view of the stator iron core viewed from the outer diameter side.
Figure 16C:
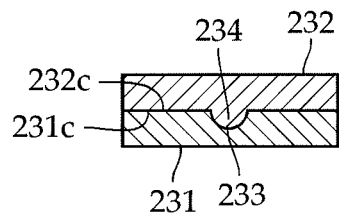
FIG. 16(c) is a schematic diagram representing a locked state of the first positional deviation preventing means.

Referring to FIGS. 16(*a*) to 16(*c*), the positional deviation preventing means includes a locking concave section 233 provided on the contact surface 231*c* of the first contact surface 231 and a locking convex section 234 protrudingly provided from the contact surface 232*c* of the second contact surface 232. The locking concave section 233 and the locking convex section 234 are provided in positions relatively aligned each other.

Each of the locking concave section 233 and the locking convex section 234 is formed in a semispherical shape. By meshing the locking concave section 233 and the locking convex section 234 each other, a state in which the yoke strips 23 are meshed each other can be maintained.

In this example, as the stator iron core 24, a pressed powder iron core that can be easily formed in an arbitrary three-dimensional shape is used. However, the present invention is not limited to this. The stator iron core 24 may be formed by laminating magnetic steel plates or may be formed by cutting or the like. The locking concave section 233 and the locking convex section 234 are formed of a set of semispherical concavity and convexity. However, two or more sets of concavities and convexities may be provided. The concavity and the convexity may be columnar concavity and convexity. Other modifications are also included in the present invention as long as concavity and convexity can be aligned with each other and can prevent positional deviation.

Figure 17A:
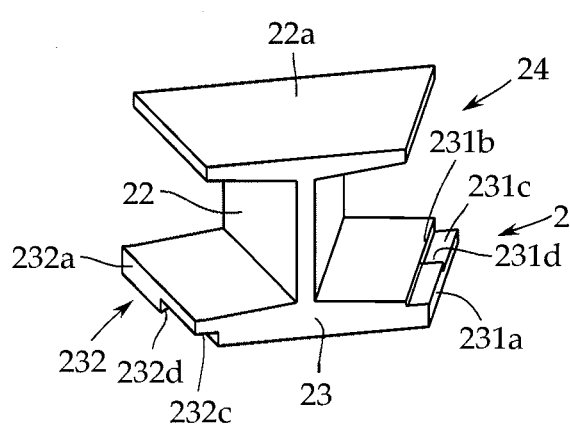
FIG. 17(a) is a perspective view of a stator iron core including second positional deviation preventing means viewed from the inner diameter side and FIG. 17(b) is a perspective view of the stator iron core viewed from the outer diameter side.
Figure 17B:
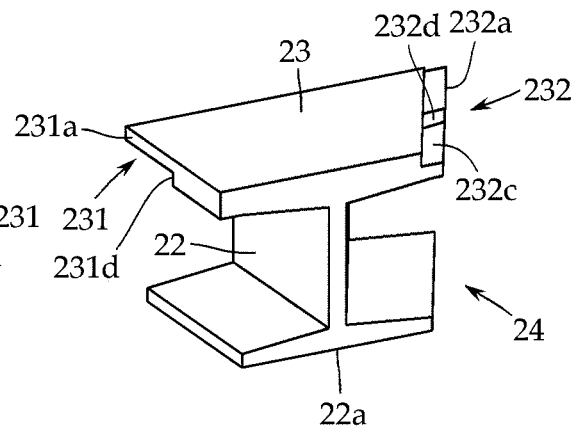

As another method of preventing positional deviation, as shown in FIGS. 17(*a*) and 17(*b*), parts of the first and second contact surfaces 231, 232 may be further recessed one step from the end faces along the circumferential direction and contact surfaces 231*d*, 232*d* that come into contact with each other along the circumferential direction may be provided.

Consequently, the first and second contact surfaces 231, 232 include the contact surfaces that are parallel in three directions: the contact surfaces (the contact surfaces 231*a*, 232*b*) parallel to the axis line direction, the contact surfaces (the contact surfaces 231*c*, 231*c*' and 231*c*', 232*c*) parallel to the radial direction, and the contact surfaces (the contact surfaces 231*d*, 232*d*) parallel to the circumferential direction.

Therefore, it is possible to prevent positional deviation simply by aligning the contact surfaces 231, 232 each other.

The assembled stator core 2 is attached to a dedicated insert mold (not shown in the figures). Thereafter, molten resin is poured into the mold and the entire stator core 2 is integrally molded by the resin leaving the teeth surface 22a. Finally, after wire connecting processing, attachment of a substrate to the substrate pedestal 11, and the like are preformed, the stator core 2 is assembled to a predetermined target apparatus.

Figure 18A:
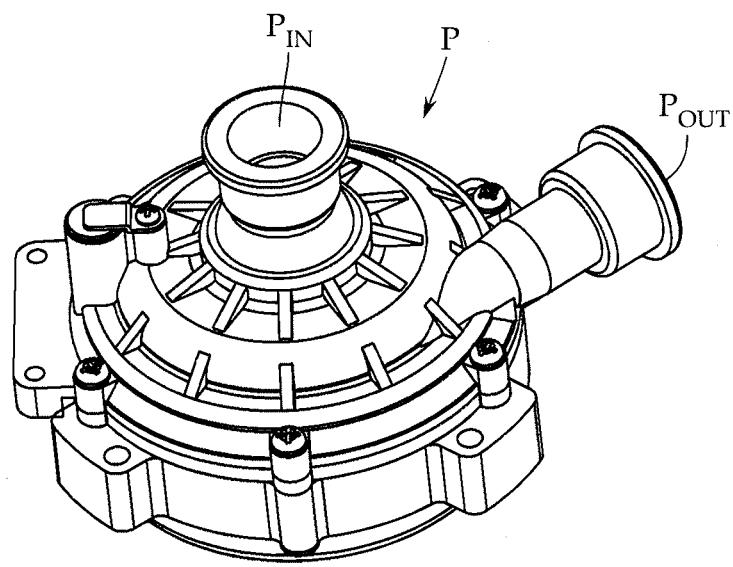
FIG. 18(a) is a perspective view of a pump device incorporating the axial gap motor according to the present invention and FIG. 18(b) is a main part sectional view of the pump device.
Figure 18B:
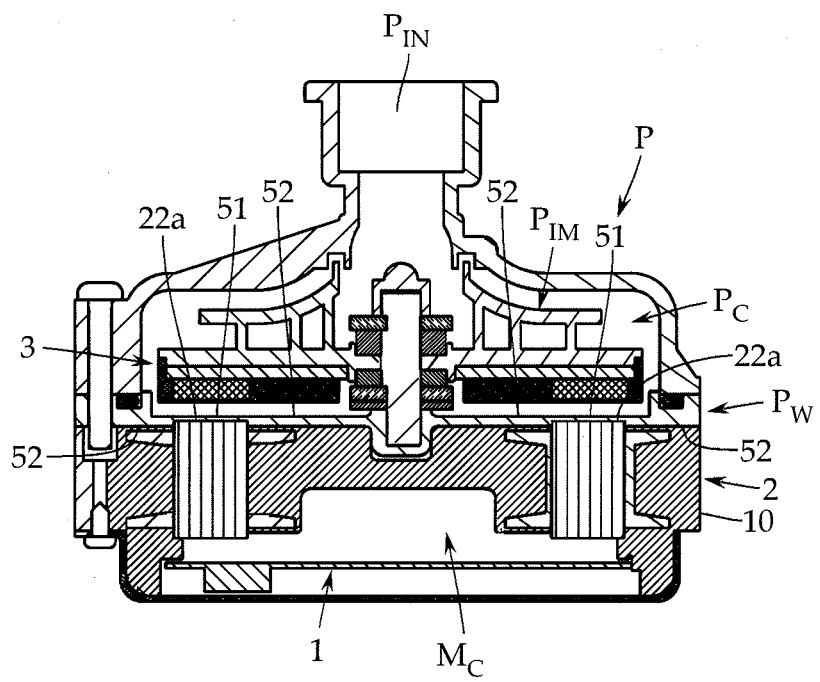

As shown in FIGS. 18(a) and 18(b), in this example, the axial gap motor 1 is desirably used in a pump device P that conveys fluid such as water. The inside of the pump device P is divided into a motor chamber $M_C$ and a pump chamber $P_C$ via a predetermined water-proof partition wall $P_W$. The pump device P includes an intake port $P_{IN}$ in the axis line direction of the rotor 3. A discharge port $P_{OUT}$ is provided in the radial direction.

On the motor chamber $M_C$ side, the stator 2 of the axial gap motor 1 is arranged. The rotor 3 is provided on the pump chamber $P_C$ side across the partition wall $P_W$. An impeller $I_M$ for a pump is integrally provided in the rotor 3. Rotational driving force of the rotor 3 directly drives the impeller $I_M$.

Figure 19:
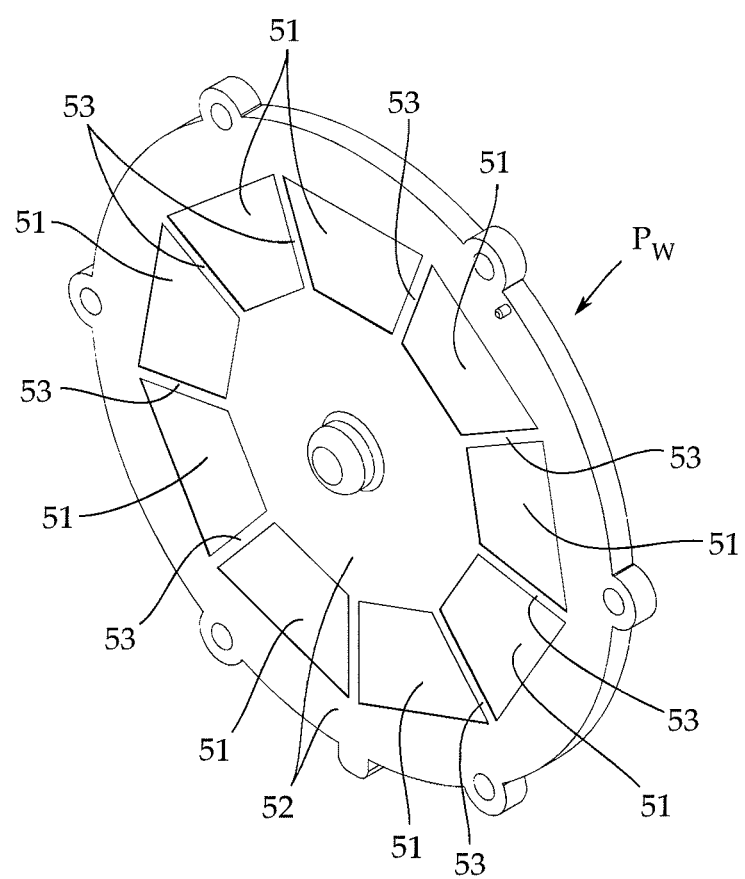
FIG. 19 is a perspective view of a partition wall of the pump device.

In this example, as shown in FIG. 19, thick portions having large thickness and thin portions having small thickness in the axis line direction are provided in the partition wall $P_W$. Specifically, the thickness in the axial direction of teeth surface opposed sections 51 opposed to the teeth surface 22a is formed small to set a gap between the teeth surface 22a and the rotor 3 as small as possible. Portions other than the teeth surface opposed sections 51, i.e., resin compact opposed sections 52 opposed to the resin compact 10 of the stator 2 which are inside and outside of the teeth surface opposed sections 51 are formed thick in order to keep strength. Further, the axial direction thickness among the teeth surface opposed sections 51 adjacent to one other are increased to form ribs 53. Therefore, the strength of the thin teeth surface opposed sections 51 is kept.

Further, the flange section 41 on the teeth surface 22a side in contact with the partition wall $P_W$ is provided such that the teeth surface 22a is formed as the outermost surface in the axial direction. Therefore, it is possible to closely attach the teeth surface 22a to the teeth surface opposed section 51 of the partition wall $P_W$. Therefore, since the teeth surface 22a and the rotor magnet 31 can be set close to the axis line direction, it is possible to suppress magnetic loss between the stator 2 and the rotor 3.

In the present invention, the axial gap motor 1 is most desirably used in a pump device. Besides, the axial gap motor 1 may be used for a general motor. Specifically, the axial gap motor 1 may be used for, for example, driving of various fans.

REFERENCE SINGS LIST 1 axial gap motor
2 stator
21a to 21i core members
22 winding section
22a teeth surface
23 yoke strip
231 first contact surface
232 second contact surface
24 stator iron core
3 rotor
31 rotor magnet
32 rotor back yoke
40 insulator
41, 41 flange sections
42 outer cylindrical section
43 hook section
44 locking shaft
45 locking rib
46 locking groove
P pump device

The invention claimed is:

1. An axial gap motor in which a stator and a rotor are arranged to be opposed to each other with a predetermined gap along an axis line direction of a rotor output shaft of the rotor, the stator includes plural core members annularly arranged around an axis line of the rotor output shaft, and the core members are coupled to one another through a predetermined coupling device, wherein each of the core members includes a stator iron core including a teeth surface opposed to the rotor, a winding section that extends in the axis line direction from the teeth surface and around which a winding wire is wound, and a yoke strip for coupling the core members to form a part of an annular yoke section on one end side in the axis line direction of the stator, contact surfaces of the core members adjacent to each other in the circumferential direction that come into contact with the yoke strip are provided on both end sides in the circumferential direction of the yoke strip, when the surface area of each of the contact surfaces is represented as As, the projected area of the lateral surface of the yoke strip viewed from the circumferential direction is represented as Ap, the contact surfaces and the lateral surfaces are formed to satisfy a relation As>Ap, each of the core members further includes an insulator that covers an outer circumference of the stator iron core leaving the teeth surface of the winding section, the insulator is formed in a bobbin shape including a pair of flange sections parallel to each other along the teeth surface and the yoke strip, and an upper flange on the teeth surface side is formed to be lower than the teeth surface in the axis line direction, and a hook section functioning as a first coupling device is protrudingly provided on one end side in the circumferential direction of the flange section, a locking shaft to which the hook section is locked is provided on the other end side in the circumferential direction of the flange section, and the locking shaft is formed to have an axial direction height lower than the teeth surface in the axis line direction.

2. The axial gap motor according to claim 1, wherein each of the contact surfaces includes two or more surfaces, and at least one of the surfaces is provided substantially parallel to the teeth surface.

3. The axial gap motor according to claim 1, wherein each of the contact surfaces includes an arcuate surface, and the arcuate surface is formed in a convex or concave shape in the circumferential direction.

4. The axial gap motor according to claim 1, wherein a positional deviation preventing device for preventing positional deviation in a state in which the contact surfaces are aligned with each other is provided on each of the contact surfaces.

5. The axial gap motor according to claim 1 wherein when the core members are coupled to one another, parts of the flange sections adjacent to each other are arranged to overlap each other in the axis line direction and a contact section on a yoke strip side where the flange sections overlap each other and a contact section of the core members are arranged such that overlapping directions are alternate in the axis line direction.

6. The axial gap motor according to claim 1, wherein the core member includes a laminated steel plate, and the contact surfaces are provided to be substantially parallel to a laminating direction of the laminated steep plate and perpendicular to the axis line direction.

7. A pump device using the axial gap motor according to claim 1, wherein the pump device is divided into a motor chamber and a pump chamber by a partition wall in which a thick portion having a large thickness and a thin portion having a small thickness in the axis line direction are provided, in the motor chamber, the stator of the axial gap motor is arranged such that the teeth surface is opposed to the thin portion of the partition wall, and, in the pump chamber, the rotor of the axial gap motor is arranged to be opposed to the stator across the partition wall.

* * * * *